(12) United States Patent
Bergquist et al.

(10) Patent No.: US 8,915,816 B2
(45) Date of Patent: Dec. 23, 2014

(54) POWERTRAIN FOR A VEHICLE AND METHOD FOR CONTROLLING A POWERTRAIN

(75) Inventors: Mikael Bergquist, Huddinge (SE); Otto Kadlac, Södertälje (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 14/129,403

(22) PCT Filed: Jun. 18, 2012

(86) PCT No.: PCT/SE2012/050668
§ 371 (c)(1),
(2), (4) Date: Dec. 26, 2013

(87) PCT Pub. No.: WO2013/002707
PCT Pub. Date: Jan. 3, 2013

(65) Prior Publication Data
US 2014/0121054 A1  May 1, 2014

(30) Foreign Application Priority Data
Jun. 27, 2011 (SE) .................................... 1150591

(51) Int. Cl.
*F16H 3/72* (2006.01)
*B60K 6/20* (2007.10)

(52) U.S. Cl.
USPC .............................................. 475/5; 475/150

(58) Field of Classification Search
USPC ................ 475/5, 150, 269, 296, 298, 331
See application file for complete search history.

(56) References Cited

U.S. PATENT DOCUMENTS

| 6,007,449 | A  | * | 12/1999 | Okada et al. ................. 475/231 |
| 6,146,302 | A  | * | 11/2000 | Kashiwase .................... 475/5 |
| 6,251,037 | B1 | * | 6/2001  | Baumgaertner et al. .......... 475/2 |
| 6,413,181 | B2 | * | 7/2002  | Okada .......................... 475/83 |
| 2003/0078127 | A1 | * | 4/2003  | Kramer ......................... 475/5 |
| 2009/0149294 | A1 | * | 6/2009  | Wallner et al. .................. 477/4 |
| 2010/0173746 | A1 |   | 7/2010  | Ideshio et al. |

(Continued)

FOREIGN PATENT DOCUMENTS

WO    WO 2010/101296 A1    9/2010

OTHER PUBLICATIONS

International Preliminary Report on Patentability dated May 31, 2013 issued in corresponding International patent application No. PCT/SE2012/050668.

(Continued)

*Primary Examiner* — Roger Pang
(74) *Attorney, Agent, or Firm* — Ostrolenk Faber LLP

(57) ABSTRACT

A propulsion device (2) for a vehicle includes an output shaft (14) of a combustion engine (4), an input shaft (27) of a gearbox (8), an electrical machine (6) having a stator (24) and a rotor (26), and a planetary gear (10) movable components (18, 20, 22). A locking mechanism (38) is movable between a first position wherein the engine output shaft (14) and the gearbox input shaft (27) are allowed to rotate at different speeds via the planetary gear (10), and a second position wherein the locking mechanism (38) firmly connects the engine output shaft (14) to the gearbox input shaft (27) via the planetary gear (10). Also a method for controlling the propulsion device (2) as disclosed.

10 Claims, 5 Drawing Sheets

(56) References Cited

U.S. PATENT DOCUMENTS

| | | |
|---|---|---|
| 2012/0115677 A1 | 5/2012 | Sakai et al. |
| 2013/0267367 A1* | 10/2013 | Kaltenbach et al. ............... 475/5 |
| 2013/0288850 A1* | 10/2013 | Kaltenbach ....................... 477/5 |
| 2014/0051536 A1* | 2/2014 | Liu et al. ........................... 475/5 |

OTHER PUBLICATIONS

International Search Report dated Nov. 20, 2012 issued in corresponding International patent application No. PCT/SE2012/050668.

* cited by examiner

POWERTRAIN FOR A VEHICLE AND METHOD FOR CONTROLLING A POWERTRAIN

CROSS-REFERENCE TO RELATED APPLICATIONS

The present application is a 35U.S.C. §§371national phase conversion of PCT/SE2012/050668, filed Jun. 18, 2012, which claims priority of Swedish Patent Application No. 1150591-4, filed Jun. 27, 2011, the contents of which are incorporated by reference herein. The PCT International Application was published in the English language.

The present invention relates to a propulsion device for a vehicle and to a method for controlling such a propulsion device.

Hybrid vehicles may be powered by a primary prime mover which may be a combustion engine, and by a secondary prime mover which may be an electrical machine. The electrical machine will be equipped with at least one battery to store electrical energy and with regulating equipment to regulate the flow of electrical energy between the battery and the electrical machine. The electrical machine may thus serve alternately as motor and generator, depending on the vehicle's operating state. When the vehicle is braked, the electrical machine generates electrical energy which is then stored in the battery. The stored electrical energy is subsequently used for operation of the vehicle.

Using a conventional clutch mechanism which disconnects the gearbox input shaft from the engine during gearchange processes in the gearbox involves disadvantages, e.g. warming of the clutch mechanism's discs, resulting in greater fuel consumption and in clutch disc wear. In addition, a conventional clutch mechanism is relatively heavy and expensive. It also occupies a relatively large amount of space in the vehicle.

Connecting the engine output shaft, the electrical machine's rotor and the gearbox input shaft to a planetary gear makes it possible to dispense with the conventional clutch mechanism. Acceleration of the vehicle will deliver increased torque from the engine and the electrical machine to the gearbox and thence to the vehicle's powered wheels. The fact that both the engine and the electrical machine are connected to the planetary gear means that the maximum torque deliverable by the engine and the electrical machine will be limited by whichever of these prime movers has lower maximum torque than the other. Should the maximum torque of the electrical machine be lower than that of the engine, the electrical machine will not be able to generate sufficient reaction torque to the planetary gear, with the result that the engine cannot transmit its maximum torque to the gearbox and thence to the vehicle's powered wheels. The maximum torque transferrable to the gearbox is therefore limited by the power of the electrical machine. In particular, when powerful acceleration of the vehicle is desired and the electrical machine cannot generate sufficient reaction torque, undesirable heat will be generated in the electrical machine.

Specification US-A1-2003/0078127 refers to a propulsion system for a vehicle with a combustion engine and an electric motor which are connected to a planetary gear. The planetary gear's planet wheel carrier is connected to an input shaft of a gearbox. The planet wheel carrier and the planetary gear's sunwheel can be firmly connected by a sleeve so that the electrical machine and the gearbox input shaft can rotate as a fixed rotating unit.

The space available for the propulsion device in a vehicle is often limited. If the propulsion device comprises a plurality of components, e.g. a combustion engine, an electrical machine, a gearbox and a planetary gear, the configuration needs to be compact. For this reason it is desired that the dimensions of the electrical machine be small, which limits its power and maximum possible torque generation.

The components of the propulsion device are also required to be of high reliability and high operational safety.

SUMMARY OF THE INVENTION

The object of the present invention is to propose a vehicle propulsion device which is of compact construction.

A further object of the invention is to propose a vehicle propulsion device which is of high reliability and high operational safety.

These objects are achieved with the propulsion device and with a method for controlling the propulsion device of the invention.

The fact that the locking mechanism firmly connects the engine output shaft to the gearbox input shaft via the planetary gear makes it possible to achieve desired acceleration of the vehicle while at the same time the dimensions and power of the electrical machine can be limited, resulting in a compact propulsion device with limited dimensions. It also makes it possible for the maximum torque which the electrical machine can generate to be lower than the maximum torque which can be generated by the engine.

According to an embodiment of the invention, the locking mechanism comprises at least one spigot which in a first position engages with a first movable component of the planetary gear and in a second position engages also with a second movable component of the planetary gear. The locking mechanism's spigot results in a compact configuration.

According to a further embodiment, the first and second movable components have recesses in which the at least one spigot is configured to engage. The spigots engaging in recesses in the planetary gear's movable components result in a compact configuration which also has high reliability and high operational safety.

According to a further embodiment, the recesses in the second movable component have a peripheral extent greater than the spigot's extent transversely to its longitudinal axis. Such a peripheral extent of the recesses provides assurance of reliable firm locking of the engine output shaft to the gearbox input shaft when the locking mechanism is moved to the second position. High reliability and high operational safety of the propulsion device are thus assured.

According to a further embodiment, the locking mechanism takes the form of an annular sleeve which substantially concentrically surrounds a portion of the gearbox input shaft or the engine output shaft. This results in a compact configuration.

A planetary gear usually comprises three components arranged for rotation relative to one another, viz. a sunwheel, a planet wheel carrier and a ring gear. Knowing the number of teeth which the sunwheel and the ring gear have makes it possible to determine during operation the rotation speeds of the three components. According to the present invention, one of the planetary gear's components is connected to an output shaft of the engine. This component of the planetary gear therefore rotates at a speed corresponding to that of the engine output shaft. A second component of the planetary gear is connected to an input shaft of the gearbox. This component of the planetary gear therefore rotates at the same speed as the gearbox input shaft. A third component of the planetary gear is connected to a rotor of an electrical machine. This component of the planetary gear therefore rotates at the same speed as the electrical machine's rotor if they are connected directly to one another. Alternatively, the electrical machine may be connected to the third component of the planetary gear via a transmission which has a gear ratio, in which case the electrical machine and the third component of the planetary gear can rotate at different speeds. The speed of electrical machines can be regulated steplessly. In operating situations where a desired speed is to be imparted to the gearbox input shaft, a control unit uses knowledge of the engine's speed to calculate the speed at which the third component has to be driven for the gearbox input shaft to run at the desired speed. A control unit activates the electrical machine so that it imparts the calculated speed to the third component and hence the desired speed to the gearbox input shaft.

Further advantages of the invention are indicated by the detailed description set out below.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
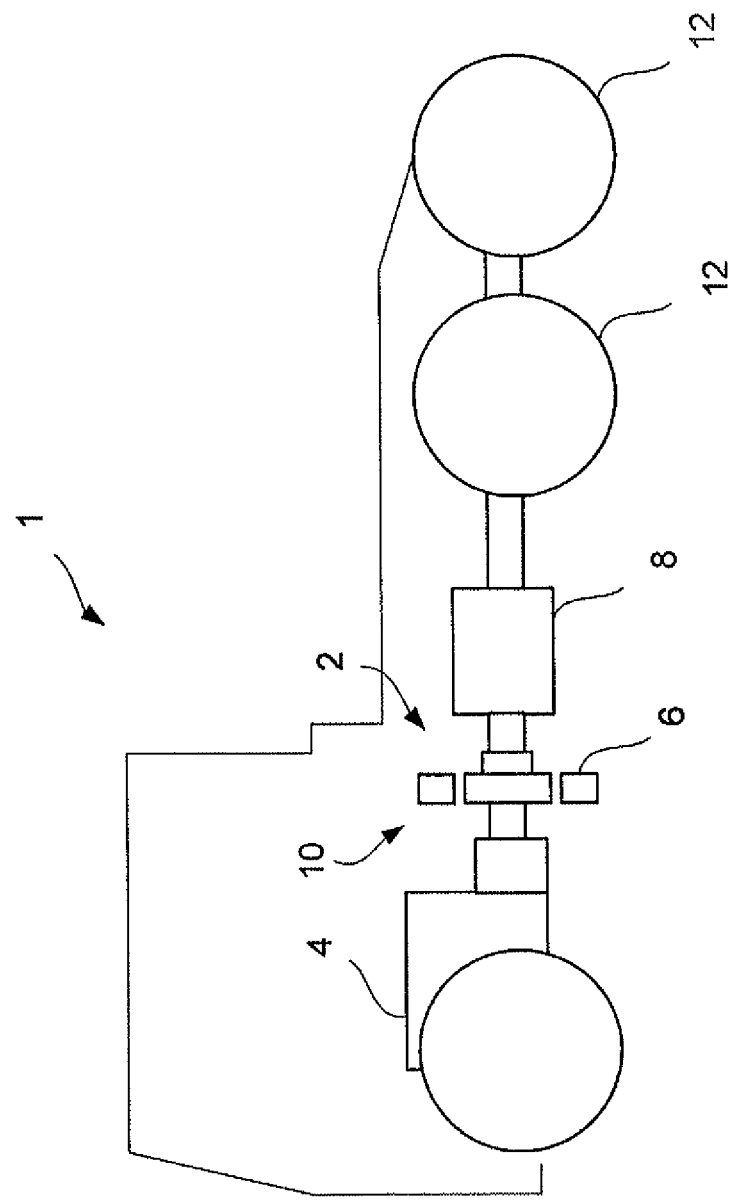
FIG. 1 depicts a vehicle in a side view with a propulsion device according to the present invention.

FIG. 1 is a side view of a vehicle 1 provided with a propulsion device 2 according to the present invention. A combustion engine 4 is connected to an electrical machine 6 and a gearbox 8 via a planetary gear 10. The gearbox is also connected to the vehicle's powered wheels 12.

Figure 2:
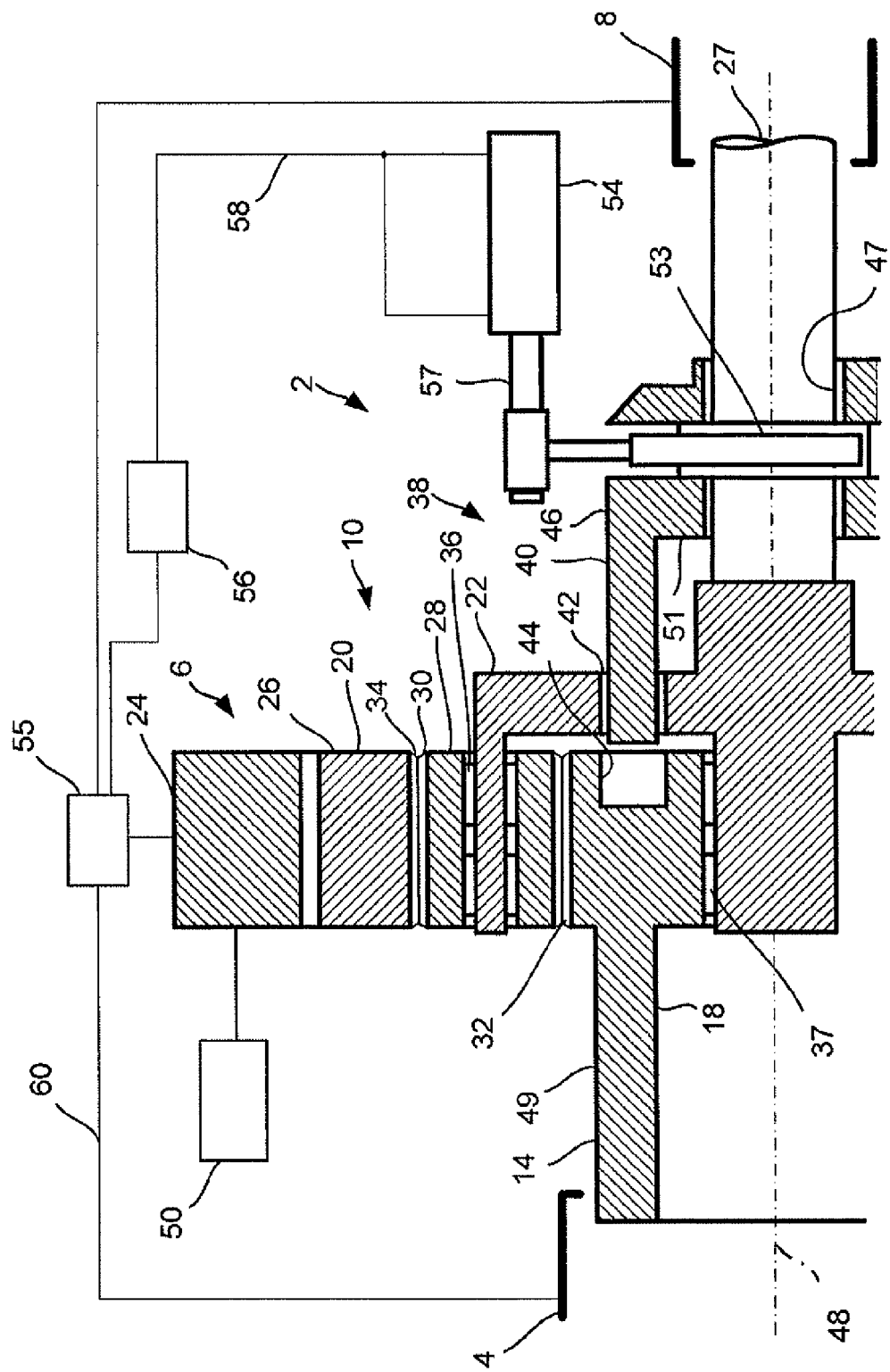
FIG. 2 is a cross-sectional view of the propulsion device according to the present invention with a locking mechanism in a first position.

FIG. 2 is a cross-sectional view of the propulsion device 2 according to the present invention. The planetary gear 10 comprises movable components in the form of a sunwheel 18, a ring gear 20 and a planet wheel carrier 22. In the embodiment depicted, the sunwheel 18 is connected to the engine output shaft 14 to form a composite unit. It is also possible to connect the engine output shaft 14 to the ring gear 20 or the planet wheel carrier 22.

The electrical machine 6 comprises a stator 24 and a rotor 26. The stator is firmly connected to the vehicle and therefore does not rotate. The rotor is connected to the planetary gear's ring gear 20 and can therefore rotate relative to the stator. In the embodiment example depicted, the ring gear 20 and the electrical machine's rotor 26 form a composite unit but it is also possible for them to be separate units connected to one another.

An input shaft 27 of the gearbox 8 is connected to the planet wheel carrier which comprises a number of gearwheels referred to as planet wheels 28 which are supported on the planet wheel carrier by, for example, rolling bearings 36. In the embodiment depicted, the sunwheel 18 is likewise supported on the planet wheel carrier by rolling bearings 37. The teeth 30 of the planet wheels 28 engage with respective teeth 32, 34 on the sunwheel 18 and the ring gear 20.

During engine braking, the driver releases the vehicle's accelerator pedal (not depicted). The gearbox input shaft 27 then drives the electrical machine 6 while at the same time the engine 4 and the electrical machine 6 apply engine braking. In this situation the electrical machine 6 generates electrical energy which is then stored in an on-board battery 50. This operating state is referred to as regenerative braking. The electrical machine 6 thus serves as a generator and in so doing exerts a countertorque to the torque from the gearbox, causing the vehicle to be braked, since the gearbox is connected to the powered wheels 12.

During acceleration of the vehicle 1, an increased amount of torque has to be delivered from the engine 4 and the electrical machine 6 to the gearbox 8 and thence to the vehicle's powered wheels 12. Since both the engine and the electrical machine are connected to the planetary gear 10, the maximum torque deliverable by the engine 4 and the electrical machine 6 is limited by whichever of these prime movers 4, 6 has a lower maximum torque than the other. Should the electrical machine's maximum torque be lower than that of the engine, the electrical machine will not be able to generate sufficient reaction torque to the planetary gear, with the result that the engine cannot transmit its maximum torque to the gearbox and thence to the powered wheels. The maximum torque transferrable to the gearbox is therefore limited by the power of the electrical machine. In particular, when powerful acceleration of the vehicle is desired and the electrical machine is not able to generate sufficient reaction torque, undesirable heat will be generated in the electrical machine.

Connecting the engine output shaft 14 to the gearbox input shaft 27 by means of a locking mechanism 38 via the planetary gear 10 makes it possible to achieve desired acceleration of the vehicle and at the same time limit the electrical machine's dimensions and power, resulting in a compact propulsion device 2 with limited dimensions. It also means that the maximum torque which the electrical machine can generate may be lower than that which can be generated by the engine.

The locking mechanism 38 is movable between first and second positions. The first position causes the engine output shaft 14 and the gearbox input shaft 27 to rotate at different speeds via the planetary gear 10. In its second position, the locking mechanism 38 connects the engine output shaft 14 firmly to the gearbox input shaft 27 via the planetary gear 10.

The locking mechanism 38 comprises at least one spigot 40 which in a first position engages with a recess 42 in the planetary gear's planet wheel carrier 22. In the second position the at least one spigot 40 engages with a recess 44 in the planetary gear's sunwheel 18. The spigot 40 has preferably a substantially circular cross-section. The locking mechanism 38 takes the form of an annular sleeve 46 which substantially concentrically surrounds a portion 47 of the gearbox input shaft 27. If the engine output shaft 14 is instead connected to the planet wheel carrier 22, it is possible for the annular sleeve 46 to substantially concentrically surround a portion of the engine output shaft 14. In such a version, the sunwheel 18 would be connected to the gearbox input shaft 27, resulting in a different gear ratio. The locking mechanism 38 is preferably provided with a plurality of spigots 40 distributed along the annular sleeve's end surface 51. To enable the spigots 40 to pass through the planet wheel carrier 22, the recesses 42 in the planet wheel carrier are of annular shape and distributed in a similar way to the distribution of the spigots along the sleeve's end surface 51.

The engine output shaft 14, the electrical machine's rotor 26, the gearbox input shaft 27 and the annular sleeve 46 are arranged for rotation about a common axis of rotation 48.

The locking mechanism 38 is movable axially along the gearbox input shaft 27 between the first and second positions. In cases where the engine output shaft 14 is instead connected to the planet wheel carrier 22, the locking mechanism 38 is movable axially along the engine output shaft 14 between the first and second positions. A shift fork 53 is provided to move the locking mechanism between the first and second positions. The shift fork is preferably controlled by a pneumatic cylinder 54 connected to a compressed air source 56. The pneumatic cylinder has a piston rod 57 on which the shift fork is mounted.

To shift and move the locking mechanism 38 from the first position to the second, the engine 4 and the electrical machine 6 are controlled in such a way that a torque-free state is created between the engine output shaft 14 and the planetary gear 10. This involves using a control unit 55 which is also adapted to causing the electrical machine 6 in certain appropriate operating situations to use stored electrical energy for providing the gearbox input shaft 27 with driving force, and in other operating situations to use the kinetic energy of the gearbox input shaft to generate and store electrical energy. The control unit 55 therefore monitors the rotation speeds and/or torques of the engine output shaft 14, the gearbox input shaft 27 and the electrical machine's rotor 26 as a basis for controlling the engine and the electrical machine in such a way that a torque-free state is created between the engine output shaft and the gearbox input shaft. When the torque-free state is achieved, the locking mechanism 38 is shifted and moved to the second position by the control unit activating the compressed air source 56 to supply compressed air to the pneumatic cylinder 54 via a line 58 so that the cylinder pushes the annular sleeve 46 by means of the fork 53. The control unit 55 is connected to the engine 4, the gearbox 8, the electrical machine 6 and the compressed air source 56 via electrical conductors 60. The control unit thus controls the movement of the locking mechanism 38. It is also possible to provide a separate control unit for the compressed air source.

The control unit 55 is thus adapted to controlling the locking mechanism 38 and also to deciding when the electrical machine 6 is to serve as motor and when as generator. To decide this, the control unit may receive current information from suitable operating parameters indicated above. The control unit may be a computer with suitable software for this purpose. The control unit controls also the flow of electrical energy between the battery 50 and the electrical machine's stator 24. At times when the electrical machine serves as motor, stored electrical energy is supplied from the battery to the stator. At times when the electrical machine serves as generator, electrical energy is supplied from the stator to the battery.

Figure 3:
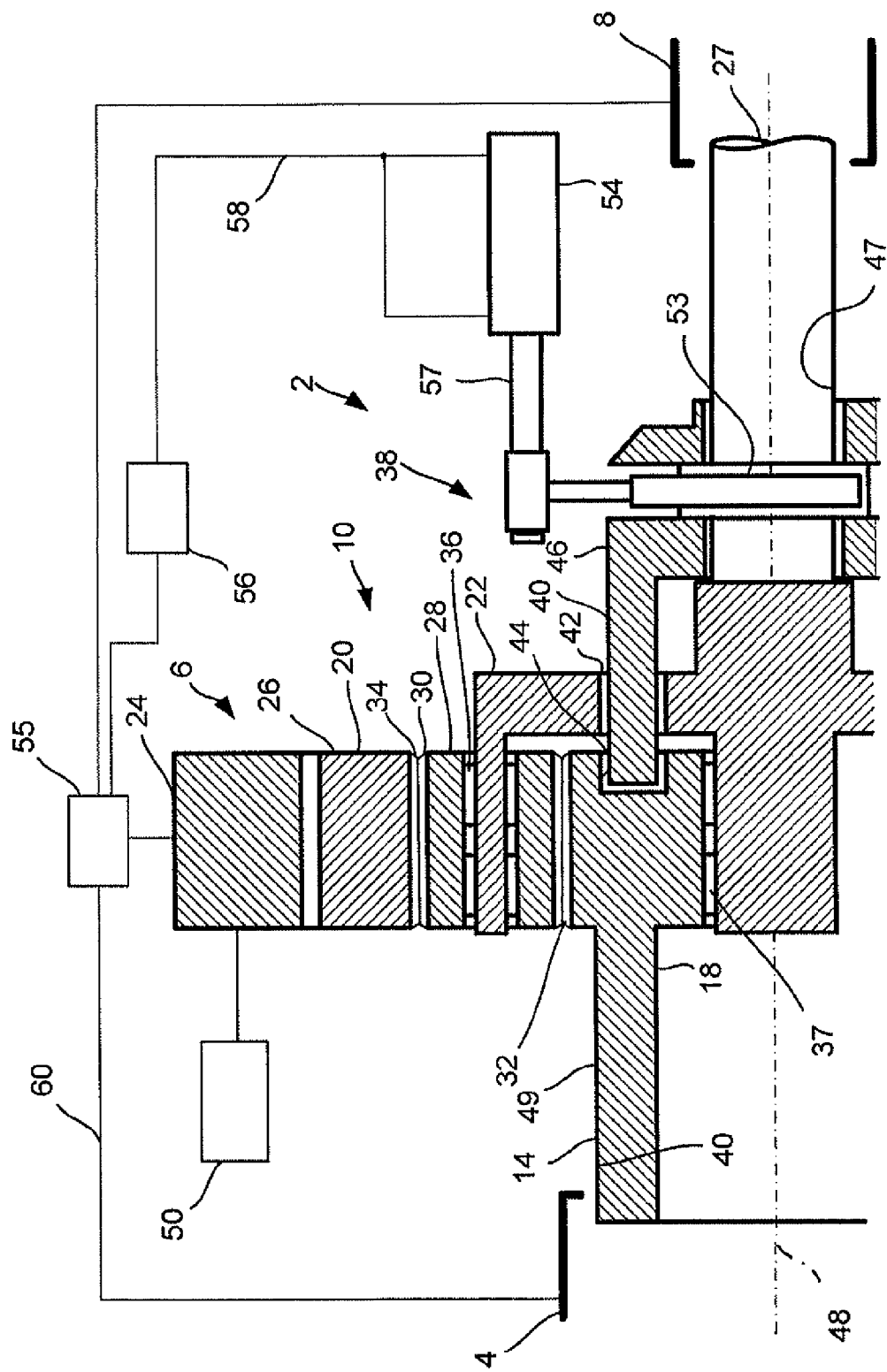
FIG. 3 is a cross-sectional view of the propulsion device according to the present invention with the locking mechanism in a second position.

FIG. 3 is a cross-sectional view of the propulsion device 2 according to the present invention with the locking mechanism 38 in the second position in which the engine output shaft 14 and the gearbox input shaft 27 are firmly connected to one another by the locking mechanism via the planetary gear 10. To make this movement of the locking mechanism possible, the control unit 55 will first control the engine and the electrical machine in such a way that a torque-free state is created between the engine output shaft 14 and the gearbox input shaft 27, as explained above in relation to FIG. 2.

When the vehicle has been accelerated to desired speed, the shift fork 53 is controlled in such a way that the locking mechanism 38 with the annular sleeve 46 is returned to the first position. At the same time, the engine and the electrical machine are controlled by the control unit 55 in such a way that a torque-free state is created between the engine output shaft 14 and the gearbox input shaft 27. When the torque-free state is achieved, the locking mechanism with the annular sleeve is shifted and moved to the first position. When the locking mechanism has been returned to the first position, the vehicle can be powered by both the engine and the electrical machine.

Figure 4:
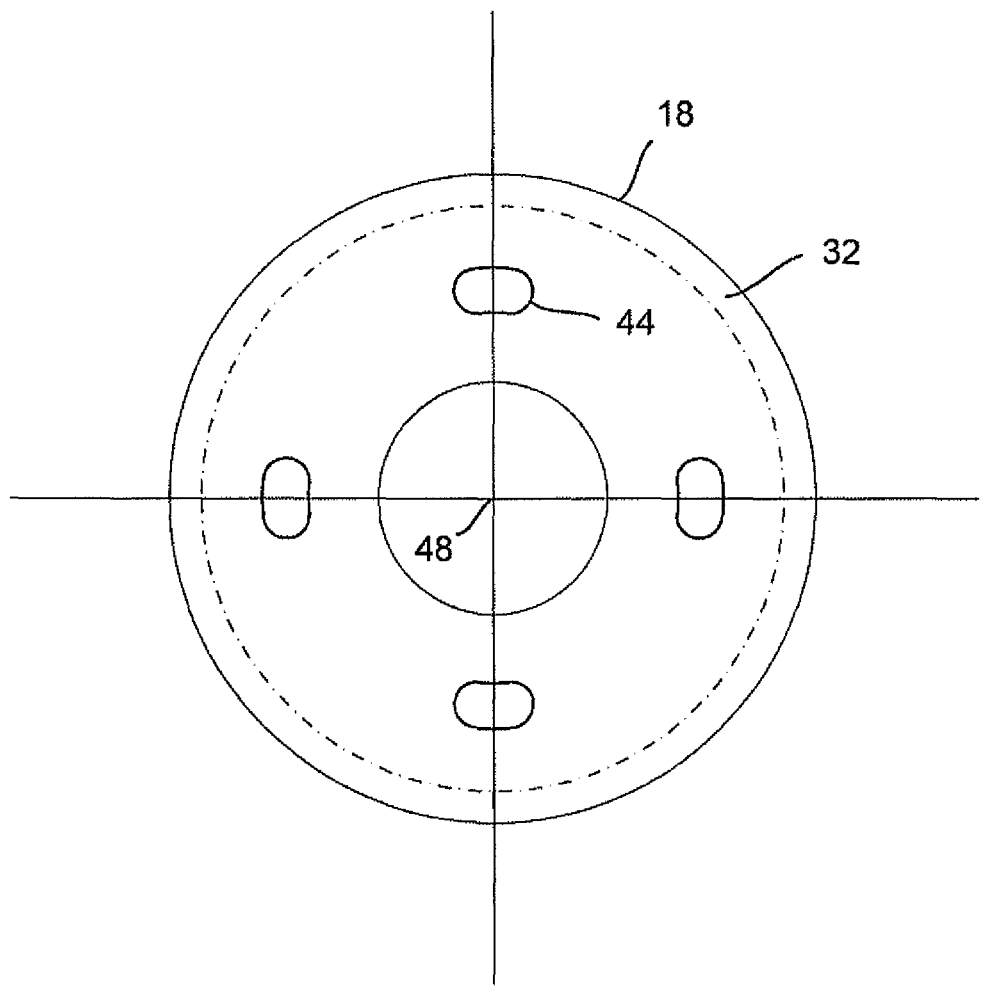
FIG. 4 depicts a side view of the sunwheel of the planetary gear of the propulsion device according to the present invention.

FIG. 4 is a sideview of the planetary gear's sunwheel 18 of the propulsion device 2 according to the present invention. The recesses 44 in the sunwheel 18 have a peripheral extent greater than the extent of the spigots 40 transversely to their longitudinal axis. Such a peripheral extent of the recesses 44 provides assurance of reliable firm locking of the gearbox input shaft 27 to the engine output shaft 14 when the locking mechanism 38 is moved to the second position. Such a shape also makes it easier to insert the spigots 40 in the recesses 44, since an axial force from the shift fork 53 can be applied to the sleeve 46 so that the spigots 40 slide past the sunwheel's end surface until they coincide with, and are then inserted in, the recesses 44. To achieve this, the engine 4 and the electrical machine 6 are controlled so that a speed difference occurs between the sunwheel and the planet wheel carrier 22 when the locking mechanism is to be moved to the second position and the spigots are to be inserted in the sunwheel's recesses 44. In the embodiment depicted in FIG. 4, four recesses 44 are evenly distributed in the circumferential direction of the sunwheel.

Figure 5:
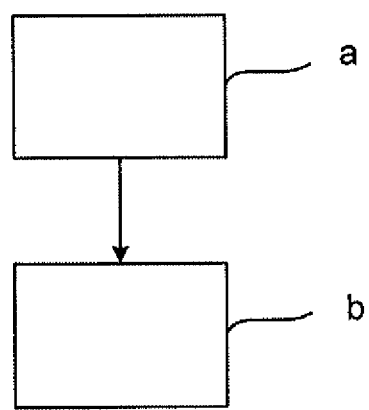
FIG. 5 is a flowchart illustrating a method for controlling the propulsion device according to the present invention.

FIG. 5 is a flowchart illustrating a method for control of a propulsion device 2 according to the present invention. The method according to the invention is characterised by the steps of a) the engine 4 and the electrical machine 6 being controlled in such a way that a substantially torque-free state is created between the engine output shaft 14 and the gearbox input shaft 27, and b) the engine output shaft 14 and the planetary gear 10 being firmly connected to one another by a locking mechanism 38 being moved from a first position in which the engine output shaft 14 and the gearbox input shaft 27 are caused to rotate at different speeds via the planetary gear 10, to a second position in which the locking mechanism firmly connects the engine output shaft to the gearbox input shaft via the planetary gear.

Components mentioned and features indicated above may within the scope of the invention be combined among the various embodiments mentioned.

The invention claimed is:

1. A propulsion device for a vehicle, the vehicle having an engine with an output shaft and a gearbox with an input shaft; the propulsion device comprising:
   the output shaft of the combustion engine;
   the input shaft of the gearbox;
   an electrical machine which comprises a stator and a rotor;
   a planetary gear which comprises movable components, including a sunwheel;
   a locking mechanism which is movable between first and second positions, wherein in the first position, the engine output shaft and the gearbox input shaft are configured to be allowed to rotate at different speeds via the configuration of and their engagement with the planetary gear, and in the second position the locking mechanism firmly connects the engine output shaft to the gearbox input shaft via the configuration and location of the planetary gear, wherein the engine's output shaft is connected to the planetary gear's sunwheel,
   wherein the locking mechanism comprises at least one spigot which in the first position of the locking mechanism is located and configured to engage with a first of the movable components of the planetary gear and in the second position of the locking mechanism is located and configured to engage also with a second of the movable components of the planetary gear.

2. A propulsion device according to claim 1, wherein the first and the second movable components have respective recesses in which the at least one spigot is located and configured to engage.

3. A propulsion device according to claim 2, wherein each of the recesses in the second movable component has a peripheral extent greater than an extent of the at least one spigot transversely to its longitudinal axis.

4. A propulsion device according to claim 1, wherein the first movable component of the planetary gear is connected to the gearbox input shaft and the second movable component of the planetary gear is connected to the engine output shaft.

5. A propulsion device according to claim 4, wherein the first movable component of the planet gear is a planet wheel carrier and the second movable component of the planet wheel is the sunwheel.

6. A propulsion device according to claim 1, wherein the locking mechanism is shiftable axially along the gearbox input shaft or along the engine output shaft during the movement of the locking mechanism between the first and the second positions.

7. A propulsion device according to claim 6, further comprising a shift fork located and configured to move the locking mechanism between the first and second positions.

8. A propulsion device according to claim 6, wherein the locking mechanism comprises an annular sleeve which substantially concentrically surrounds a portion of the gearbox input shaft or a portion of the engine output shaft.

9. A propulsion device according to claim 8, wherein the engine output shaft, the electrical machine's rotor, the gearbox input shaft and the annular sleeve are arranged for rotation about a common axis of rotation.

10. A propulsion device according to claim 1, further comprising a control unit configured and operable to controlling the electrical machine so that in first operating situations, the electrical machine is configured to use stored electrical energy to supply driving force to the gearbox input shaft, and in other operating situations, the electrical machine is configured to use kinetic energy of the gearbox input shaft to generate and store electrical energy.

* * * * *